Patented Aug. 18, 1936

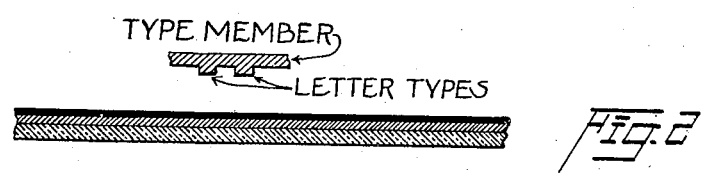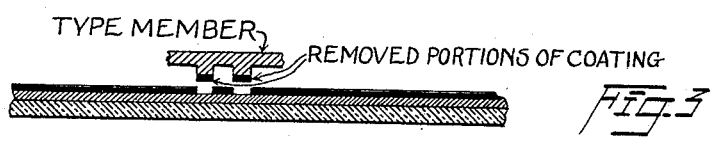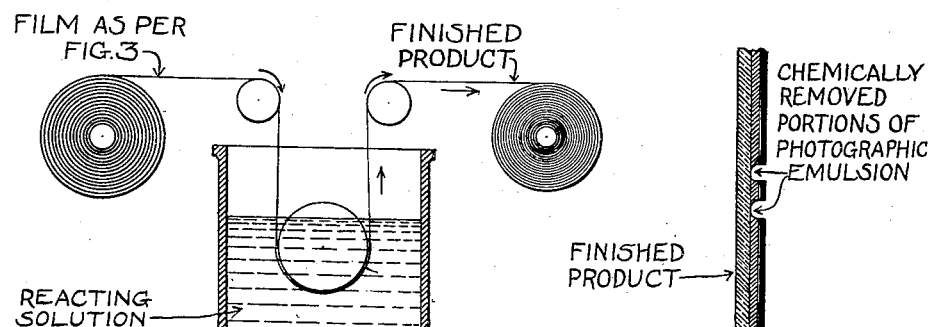

2,051,603

UNITED STATES PATENT OFFICE 2,051,603

PROCESS FOR THE PRODUCTION OF THE EXPLANATORY TITLES FOR THE PICTURES ON CINEMATOGRAPHIC FILMS

Rudolf Hruska, Budapest, Hungary

Application June 8, 1933, Serial No. 674,850
In Hungary June 9, 1932

1 Claim. (Cl. 41—41)

My invention relates to a process for the production of the explanatory titles for the pictures on cinematographic films.

The main object of the invention is to enable the explanatory titles of the pictures of the cinematographic film to be produced either before photographic development, or after the development of the picture, i. e., by way of a subsequent operation on the completed film, in a relatively easy manner and in an accurate form.

In the accompanying drawing forming part hereof,

Fig. 1 is a representation of a film having a photo-sensitive layer of emulsion thereon.

Fig. 2 is a similar view with a protective coating in place upon the emulsion.

Fig. 3 is another view of the same with parts of the coating removed.

Fig. 4 is a diagrammatic view on a reduced scale of an arrangement for carrying out the invention.

Fig. 5 is an enlarged fragmentary view of the film in finished condition.

On cinematographic films, particularly on sound films it is usual to apply, for the purpose of presenting the films in countries, the language of which is different from that of the film, titles worded in the language of the respective country. In the case of ordinary films comprising no sound record each explanatory title was usually reproduced on a separate film band and this band of several metres length was inserted between the scenes of the film cut up into corresponding sections and cemented in. In the case of sound films it has not been possible to employ this method, as by doing so the sound record strip running along the border of the film would have been spoiled. Accordingly, the procedure employed in the case of sound films was to apply the explanatory titles on the small picture sections of the individual scenes themselves in the form of a few lines arranged at the bottom of the picture section. The actual carrying-out of this method was rather cumbersome. Often, it was necessary to cut-out from the original films the scenes, on the picture sections of which it was desired to apply the necessary titles and to produce, from these parts of the film, by means of the so-called doubling method, first a negative and subsequently a positive picture copy. Following this, the desired texts were written or drawn, the "mutations" thus produced were photographed and the two parts, i. e., the new copy and the newly produced texts were copied one on the other; finally, the film part thus produced was cemented in into the original film. When the film was projected on the screen, the text appeared on the dark part of the picture in the form of the usual, easily readable white letters.

Apart from the fact that by cutting up the film its continuity had been broken and thereby the sound record film had, in many cases already been spoiled, in spite of its being subsequently cemented in again, nevertheless, it has heretofore actually never been possible to obtain a "double-copy" of the sound record film which was quite as accurate as the original, and yet this process was very cumbersome, expensive and entailed a great loss of time. The work had to be done with very great care, and because the cut-out parts of the original film thus replaced by copies were lost, this formed an inherent drawback of the process.

In order to eliminate these drawbacks, methods have already been proposed, wherein the photographic layer of the film was softened by moistening it, following which type bodies or printing blocks representing the desired texts were stamped into the softened layer, whereby to force aside the desired parts so as to produce transparent matter. While this simplified the method it was nevertheless unsatisfactory, because the direct mechanical stamping-out of the individual parts of the layer produced unsatisfactory shapes of type, presenting irregular, vague contours, with numerous defective portions exaggerated in a still more marked manner when projected on the screen. Accordingly, these processes are inadequate and not practical.

According to the present invention, lettering having very accurate contours can be produced on the films, in a simple and relatively inexpensive way by treating the film, on those parts of its surface which correspond to the lettering desired, with a solvent in which the photographic emulsion layer is soluble. Especially these parts of the surface of the film are now removed either in whole or in part down to the transparent celluloid base of the film, by means of a solvent such as mineral acids or alkalies, e. g., sulphuric or hydro-chloric acid, or sodium hydroxide or potassium hydroxide. In this connection the expression "photographic layer" is used to mean either unexposed light-sensitive layer, or the exposed picture layer which is perhaps already in a condition ready for use.

The most simple method for bringing the photographic layer and the solvent into mutual contact would consist in dipping a writing pen or the like, into the solvent or filling the same with the solvent and writing or drawing the desired text on the photographic layer of the film. Such a procedure is inconvenient and it is therefore necessary to render the procedure mechanical if possible, by employing the methods and means usual in the technique of reproduction. Hence, the solvent is applied to the photographic layer by means of printing blocks, cylinder, type-bodies or stencils with cut-out openings, corresponding to the desired letters.

According to a preferable mode of carrying the process into effect, what is thus removed by solution from the surface of the film, is not the whole emulsion layer, but only the silver or the compound in the emulsion in order to obtain a more resistant product. Especially in those cases when the process is applied prior to development of the film, the silver compound such as silver bromide is removed by a solvent such as ammonia, cyan-compounds or thiosulphates, or hyposulphites, whilst in those cases when the process is applied after development, the silver reduced by the development is converted by means of a known chemical solution or compound into a soluble chemical compound of silver such as silver-chloride after which this chemical compound is removed by any known solvent therefor. As a result the emulsion layer of the film will become either semi-transparent or as transparent as glass at the spot where the reaction has taken place, according to the particular reaction involved.

The pure silver in the emulsion layer of the film can be converted into different soluble chemical compounds: as, for instance, silver chloride AgCl, silver iodide AgI, bichromate of silver $Ag_2Cr_2O_4$, ferri-cyanide of silver $Ag_3(FeC_6H_6)$ etc.

The reacting solvent or compound may, for instance, be composed as follows: 15 grams of magnesium chloride $MgCl_2$, 15 grams of copper chloride $CuCl_2$, 30 grams of glycerine $C_3H_5(OH)_3$ and 170 grams of $H_2O$.

In carrying the process into effect in practice, the reacting compound may, for instance, be applied by means of a small feed roller on a larger roller which engages with the film-band and has letter-bodies either projecting from the surface thereof, or, if preferable, they may be engraved into the same. This larger roller is raised out of contact after completing a line by a sufficient angle to correspond to the distance between the individual lines of the desired titles of the film. After each such partial removal the roller is lowered so that its surface will touch the emulsion and will make sure contact therewith by simply exerting a sufficient contact pressure on the emulsion layer, in contrast with the earlier process mentioned above, in which actual stamping-out of part of the emulsion layer occurred. By these means the solvent compound is transferred to the emulsion of the film in a manner corresponding to the letter forms on the roller.

The movement of the film band thus prepared is then continued, and it is wound on the usual wooden reels, and while on the latter rinsed with water, etc. and subsequently immersed into a solution which consists, for instance, of 2500 grams of sodium thiosulphate ($Na_2S_2O_3$) and 10 litres of water, in which solution the soluble compound, into which the silver in the emulsion has now been converted, is dissolved. The film layer thus becomes transparent like glass in those places where the reaction has taken place, so that it is possible to obtain pure white projected images corresponding to the form of said parts. After such removal, by the solvent, of the mentioned parts, the film is rinsed several times in the usual manner in clean running water. The reaction is completed in a few minutes after initial contact of the reaction substance with the film layer. Different degrees or shades of transparency can be obtained by applying the reacting solution or compound in a diluted or concentrated form and by allowing it to act on the emulsion layer of the film for a shorter or longer period of time.

In case it is desired to enable the reacting liquid to be applied on the letter types in the form of a firmly adherent solid layer, it is possible to admix neutral filling substances such as dextrine, starch etc. to the reaction liquid. For the purpose of applying the solution or reacting compound it is also possible to employ stencils fixed on the film, having cut-out openings corresponding to the desired letters, so that by coating these stencils or the cut-out openings with the reacting substance, the shape of that part of the film surface, where the silver is to be converted, can be accurately defined. The process can also be carried out after previously moistening the surface of the film, in order to assist or accelerate the reaction by these means.

In general, the reacting liquid or compound can be brought into contact with the photographic layer with the aid of any desired and usual means and methods of reproduction technique, and the type bodies ore type blocks etc. corresponding to the desired letters may be made of porous material, such as gypsum, clay or unglazed porcelain, whereby a more perfect adherence of the reacting solution or compound to the surface on which it is applied is ensured.

As mentioned above, the stencils may consist of any material usually employed for such purposes, as for instance of paper, celluloid or thin sheet metal. According to a further development of the invention it is possible to obtain an extremely clear and sharp contour of the letters by producing the stencil on the film itself. For this purpose that portion of the emulsion surface which is intended to receive the desired letters is coated with a plastic or liquid material, which subsequently dries-up or solidifies, and which is impervious to the solvent or the reacting compound, e. g. with paraffin, wax petroleum jelly, printer's ink, or varnish. From the coat or pellicule thus produced the surface parts corresponding to the desired letters are removed in the manner described below, following which the solvent or the like is allowed to act through the interstices thus formed on the photographic layer, either by the immersion of the film or by applying the solvent, etc., on the film by means of a brush. After thus completing the process, the coat used as a stencil is either removed from the film band or allowed to remain on the same.

On the photographic layer, the coat which is to form the stencil can be produced by dipping the film into the coating substance or by applying this coating substance on the film by means of a brush, following which the parts corresponding to the desired letters can be removed from the coat by stamping, or by bringing the type-bodies, plates carrying the type bodies, printing blocks, stamp devices or rollers into adherent contact with the coat or possibly by previously applying the solvent of the coating substance on the said type bodies, etc., by solution or with the aid of a brush and thus removing the desired parts. Said bodies may in the case of a coat consisting of petroleum jelly or the like, wax, or paraffin, be heated and the desired parts thus removed by melting them off.

It is, however, also possible to proceed in such manner that simultaneously with the coating of the film with the material forming the stencil, the interstices also are immediately produced in the desired form. This result is obtained by coating plates or cylinders into which the letters have been engraved with the substance which is to form the stencils, after which the plates or cylinders are brought into contact with the film, whereby the material forming the stencils is transferred on the film, in the course of which procedure parts corresponding to the engraved spots mentioned will remain free on the film.

Another feature of the invention involves the protection of the film during the operations mentioned as well as in its completed condition, and accordingly includes two different kinds of protective coat. Owing to the fact that the photographic layer is not only optically sensitive, but also sensitive to mechanical handling, it is advantageous to provide on this layer, for the duration of the various operations, a protective coat or pellicule consisting of gelatine, shellac or varnish, from which protective coat the interstices corresponding to the letters to be produced on the film can be removed, by a roller, or by means of stamping, after which the reacting compound is applied as already intimated, by means of the roller mentioned. It is self-evident, however, that in the form of the invention wherein a coat serving as a stencil is produced on the film itself, this coat will itself at the same time also form a protective coat, and in this case the special protective coat described above is unnecessary. In those forms of the process, wherein the emulsion layer is removed by means of a solvent, and cavities corresponding to the letters are formed, the completed film is coated with a protective layer consisting of a resilient and transparent material, as for instance of gelatine, dissolved cellulose acetate products, nitro-cellulose or varnish, this protective coat preventing any deposit of dirt or dust in the cavities.

In case the picture field is of such light color that the texts now produced will not stand out in sufficient contrast with the base surface, it is possible to provide, according to a further feature herein, either opaque, semi-transparent or wholly transparent letters in a different color, in such manner, that the parts or cavities produced as described, forming the letters of the photographic layer are coated or filled with some kind of paint. The excess quantity of paint is removed, during this operation, by means of a rubber or film slab. Paints which may thus be employed are printer's ink, oil paint, or dissolved aniline colors, or paints mixed with celluloid, nitro-cellulose, gelatine, varnishes or other fixing media. In order to ensure that these paints should adhere more firmly to the film, a solvent in which the basic substance of the film band is soluble, such as acetone or amylacetate may be admixed to the paints.

Another feature of the invention relates to color films, in which the individual pictures represent reproductions of natural colors. In such films photochemically reduced silver is not present at all, or present in a quite insignificant quantity only, and moreover the quantity of emulsion fixative such as gelatine, is also quite insignificant. In photographic productions of this kind the pictures are mutually superposed in three colors according to the principle of the three-color process and fixed by a special fixing medium, as a result of which superposition the total picture, showing the original colors, is obtained. For films of this kind the known processes first mentioned herein are impractical because in said processes the photographic layer is softened, after which type-bodies, etc., having the desired explanatory titles are stamped into the layer, particularly because in the case of color films there is no layer of practically suitable thickness into which it would be possible to stamp the type bodies.

In contrast with such prior attempts to produce satisfactory results, the process of the present invention is after certain modifications, actually successful and perfectly suitable from a practical point of view, for producing the desired letters on colored photographic products in a relatively inexpensive manner and in accurate shape. According to the invention the photographic layer is treated on such intended parts of its surface, employing for this purpose the type bodies, etc., or stencils as described,—with chemical substances of such a nature, by which the coloring materials of the mutually superposed colored pictures are made colorless, bleached, or destroyed. Such coloring materials are, in the first place, solutions of oxychlorides or peroxides, as for instance hypochloride of potassium or sodium, water saturated with chlorine gas, solutions of perborates, hydrogen peroxide, permanganate of potassium or solutions of bichromates.

As most of the chemical compounds in question are likely to chemically attack the material of the printing blocks, type-bodies, cylinders or stamps which may be used in the process as described above, the surfaces of said bodies may, before coating them with the chemical compounds in question, be coated with a protective layer. However, as this manner of carrying out the process would render the process rather complicated, it is advisable that in the case of color films stencils produced on the photographic layer itself as already described should always be employed.

In those kinds of colored photographic products, in which there exists, in addition to the mutually superposed colored pictures, also a picture layer containing reduced silver, two methods described above for carrying out the invention are mutually combined. First the removal by solution of the silver layer is performed and then the color layers are bleached, but it is also possible to apply these two procedures in the reverse sequence.

I claim:

The step-by-step process for producing explanatory titles systematically and in continuous manner for a plurality of successive scenes in a series of pictures upon cinematographic films for projection, which consists in producing directly upon the photographic layer of the film, a stencil having cut-out openings corresponding with the desired letters of said explanatory titles by first coating said photographic layer with a protective substance impervious to a solvent of silver and a soluble compound thereof, then removing from the coating thus applied those portions desired to form the letters of the intended titles, by bringing suitable type bodies into intimate adherent contact with said protective coating and removing said type bodies, subjecting the portions of the photographic layer thus exposed through said coating to the action of a reacting solution to convert the silver in the exposed portions of said photographic layer into a soluble compound of silver and removing the silver compound thus formed by means of a solvent of said silver compound.

RUDOLF HRUSKA.